(12) United States Patent
Liu

(10) Patent No.: US 11,113,020 B2
(45) Date of Patent: Sep. 7, 2021

(54) DISPLAY SYSTEM AND SCREEN OPERATION METHOD THEREOF

(71) Applicants: BenQ Intelligent Technology (Shanghai) Co., Ltd, Shanghai (CN); BENQ CORPORATION, Taipei (TW)

(72) Inventor: Kuo-Ching Liu, New Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 15/930,556

(22) Filed: May 13, 2020

(65) Prior Publication Data

US 2020/0394011 A1 Dec. 17, 2020

(30) Foreign Application Priority Data

Jun. 14, 2019 (CN) .......................... 201910515970.8

(51) Int. Cl.
*G06F 3/14* (2006.01)
*G06T 3/40* (2006.01)
*G06T 11/60* (2006.01)
*G09G 5/00* (2006.01)
*G06F 3/0488* (2013.01)

(52) U.S. Cl.
CPC .............. *G06F 3/1423* (2013.01); *G06T 3/40* (2013.01); *G06T 11/60* (2013.01); *G06F 3/0488* (2013.01); *G06T 2200/24* (2013.01); *G09G 5/003* (2013.01); *G09G 2354/00* (2013.01)

(58) Field of Classification Search
None
See application file for complete search history.

(56) References Cited

U.S. PATENT DOCUMENTS

| 2007/0216712 | A1* | 9/2007 | Louch | G09G 5/363 345/660 |
| 2013/0002522 | A1* | 1/2013 | Wilsher | G06F 3/1423 345/1.2 |
| 2013/0307796 | A1* | 11/2013 | Liu | G09G 5/14 345/173 |
| 2015/0089393 | A1* | 3/2015 | Zhang | G06F 3/1446 715/753 |
| 2018/0203527 | A1* | 7/2018 | Matsui | G06F 3/0488 |
| 2020/0066047 | A1* | 2/2020 | Karalis | G06F 3/011 |

FOREIGN PATENT DOCUMENTS

| CN | 105874414 A | 8/2016 |
| CN | 109271086 A | 1/2019 |
| TW | 201408053 A | 2/2014 |

OTHER PUBLICATIONS

Office action of counterpart application by Taiwan IP Office dated Jul. 22, 2020.

* cited by examiner

*Primary Examiner* — YuJang Tswei

(57) ABSTRACT

A display system includes a display module and a controller. The display module is configured to display a first frame including a part image, wherein the part image is located in a first region of the first frame. The controller is configured on the display module and is configured to capture the part image of the first frame and displays the part image in a second region different from the first region. The controller responds to an operation for one of the first region and the second region, the same operation for the other of the first region and the second region is performed.

18 Claims, 5 Drawing Sheets

DISPLAY SYSTEM AND SCREEN OPERATION METHOD THEREOF

This application claims the benefit of People's Republic of China application Ser. No. 201910515970.8, filed Jun. 14, 2019, the subject matter of which is incorporated herein by reference.

BACKGROUND OF THE INVENTION

Field of the Invention

The present disclosure relates to a system and an operation method thereof, and more particularly to a display system and a screen operation method thereof.

Description of the Related Art

A known large-sized electronic whiteboard has a height that is even higher than height of normal person and a width that is even larger than width of normal person's open hands. As a result, when operating the electronic whiteboard, the user must move back and forth. Especially for users with short stature, it is more difficult to operate the screen at high places. Therefore, it is one of the efforts of those skilled in the art to propose a technique for conveniently operating the screen of the electronic whiteboard.

SUMMARY OF THE INVENTION

The invention is directed to a display system and a screen operation method thereof capable of resolving the above-mentioned problems encountered in the prior art.

According to an embodiment of the present invention, a display system is provided. The display system includes a display module and a controller. The display module is configured to display a first frame, wherein the first frame includes a part image located in a first region of the first frame. The controller is disposed on the display module and configured to capture the part image of the first frame and display the part image on a second region different from the first region. In response to an operation on one of the first region and the second region, the controller is configured to perform the same operation on another of the first region and the second region.

According to another embodiment of the present invention, a screen operation method of a display system is provided. The screen operation method includes the following steps: a part image of a first frame displayed on the display system is captured, wherein the part image is located in a first region of the first frame; the part image of a second region different from the first region is displayed; and in response to an operation on one of the first region and the second region, the same operation on another of the first region and the second region is performed.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
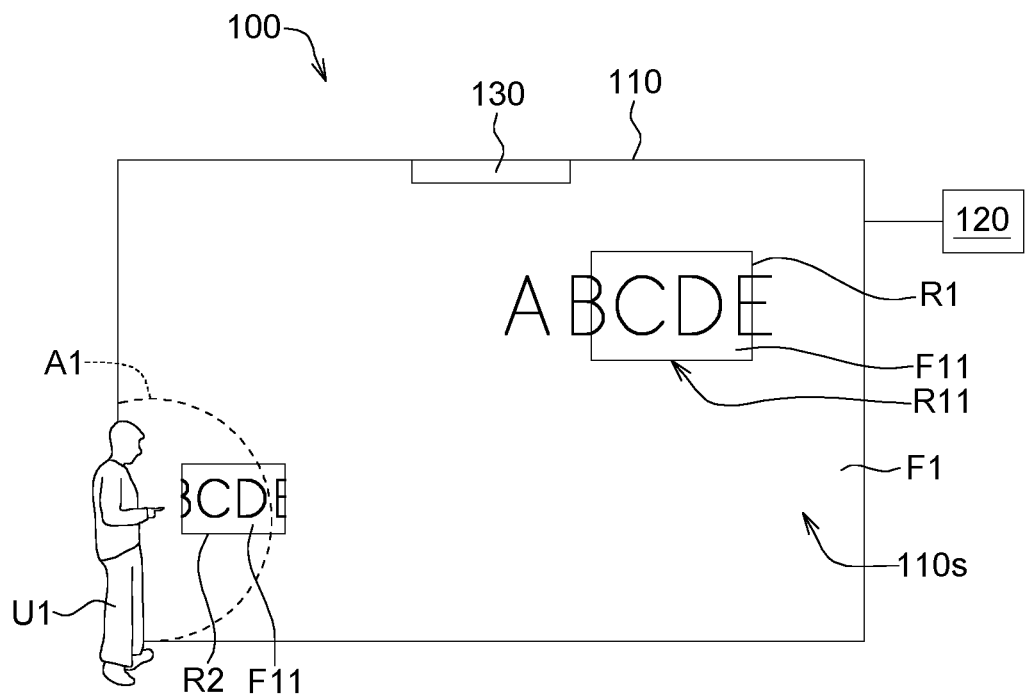
FIG. 1 shows a schematic diagram of a display system according to an embodiment of the present invention.

Referring to FIG. 1, FIG. 1 shows a schematic diagram of a display system 100 according to an embodiment of the present invention. The display system 100 includes a display module 110 and a controller 120. The controller 120 could be disposed inside or outside the display module 110 to control a screen operation function of the display module 110. In an embodiment, the display module 110 is, for example, a touch display device, such as an electronic whiteboard. The display module 110 could also be a projector, and the touch function could be achieved through image processing technology. In addition, the display module 110 has size ranging between, for example, 43 inches and 86 inches, but it could also be a larger size, for example, 98 inches.

The display module 110 is configured to display a first frame F1. The first frame F1 includes a part image F11 located in a first region R1 of the first frame F1. The controller 120 is configured to capture a part image F11 of the first frame F1 and display the part image F11 of a second region R2 different from the first region R1. The controller 120 responds to an operation on one of the first region R1 and the second region R2, and performs the same operation on another of the first region R1 and the second region R2.

In the present embodiment, the part image F11 covers the second region R2 of the first frame F1. In other words, the first region R1 and the second region R2 are both located on the same frame (for example, the first frame F1) of the same display device (for example, the display module 110).

As shown in FIG. 1, the first region R1 is located outside the user's arm movement scope A1 with respect to the display surface 110s of the display module 110, and the second region R2 is located within the arm movement scope A1 with respect to the display surface 110s of the display module 110. In the present embodiment, since the controller 120 responds to the operation of user U1 on the second region R2, the controller 120 performs the same operation on the first region R1. Therefore, even if the first region R1 is located outside the arm movement scope A1 with respect to the display module 110, the first region R1 could be operated by operating the second region R2.

As shown in FIG. 1, the display module 110 displays a boundary line R11 of the first region R1 of the first frame F1, where the boundary line R11 is, for example, a solid line or a dashed line, and the boundary line R11 could flash dynamically or statically maintain the same form. In one embodiment, after a predetermined time elapses, the controller 120 could hide the boundary line R11 of the first region R1. For example, during the predetermined time, if size or position of the first region R1 does not change, the controller 120 could hide the boundary line R11 of the first region R1. In a case where the boundary line R11 of the first region R1 is hidden, when the size or the position of the first region R1 changes, the controller 120 could resume the display of the boundary line R11.

Figure 2:
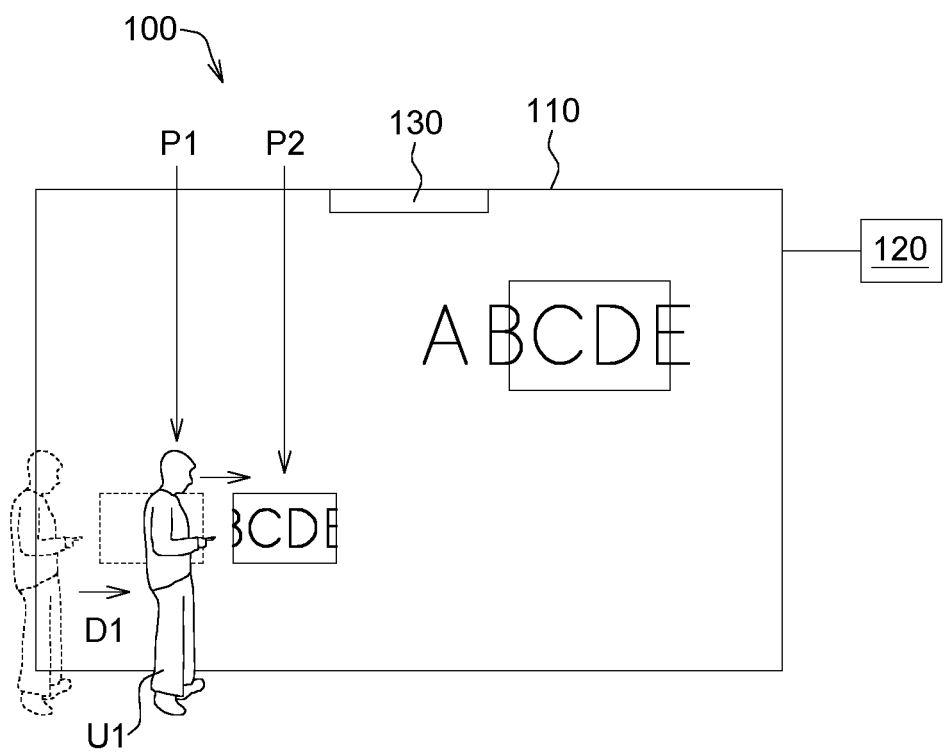
FIG. 2 shows a schematic diagram of another screen operation method of the display system of FIG. 1.

Referring to FIG. 2, FIG. 2 shows a schematic diagram of another screen operation method of the display system 100 of FIG. 1. The controller 120 could track the moving position of the user U1, and move the second region R2 to the second position P2 corresponding to the first position P1 where the user U1 moves to, so that the second position P2 is adjacent to the first position P1. For example, as shown in FIG. 2, the display system 100 further includes a position detector 130, which could be disposed on upper portion of the display module 110 to detect the position of the user U1 downwardly. When the position detector 130 detects that the user U1 moves to the first position P1 in a direction D1, the controller 120 moves the second region R2 to the second position P2, wherein the second position P2 is adjacent to the first position P1, and thus it is convenient for the user U1 to operate the second region R2 nearby. In an embodiment, the user U1 moves a distance in the direction D1, and the controller 120 moves the second region R2 in the same distance in the direction D1.

In another embodiment, the user U1 could adjust the position of the second region R2 by touch. For example, the user U1 could touch the part image F11 of the second region R2 with multiple fingers (for example, two fingers), and then moves the multiple fingers to the second position P2 simultaneously as shown in FIG. 2. After releasing the finger, the controller 120 moves the second region R2 to area corresponding to the second position P2. In this example, the position detector 130 could be omitted. In addition, the touch method of the screen operation method of the present embodiment is not limited by the above-mentioned multi-finger touch method.

Figure 3:
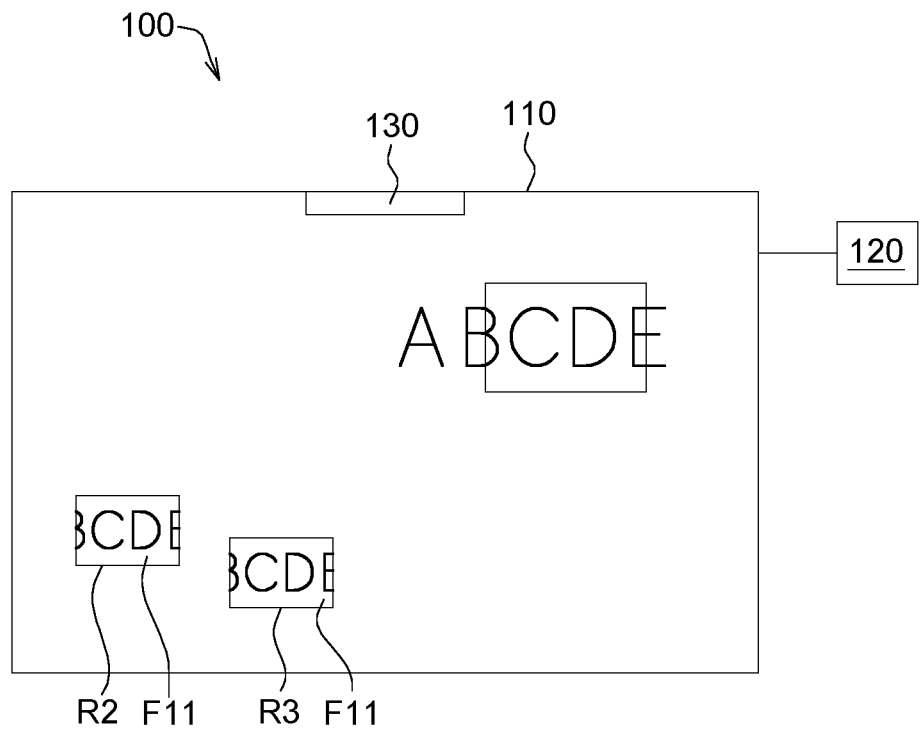
FIG. 3 shows a schematic diagram of another screen operation method of the display system of FIG. 1.

Referring to FIG. 3, FIG. 3 shows a schematic diagram of another screen operation method of the display system 100 of FIG. 1. The controller 120 responds to a copy instruction and copies the part image F11 of the second region R2 to a third region R3 different from the second region R2, wherein the operation on the part image F11 of the third region R3 is not reflected to the part image F11 of the second region R2. For example, the user could edit the part image F11 of the third region R3, the content of the edited part image F11 is not reflected to the second region R2 since there is no linkage relationship between the third region R3 and the second region R2. In an embodiment, in response to a storage instruction from the user, the controller 120 stores (or saves) the part image F11 of the third region R3 to an image file (not shown).

In an embodiment, the foregoing copy instruction is generated, for example, by long-presses (for example, 1 second to 3 seconds) the second region R2, waiting for the second region R2 to float in the screen, and then dragging the floating second region R2 to the third region R3 as shown in FIG. 3, and then after releasing the floating second region R2, the controller 120 copies the part image F11 to the third region R3 in the second region R2. In addition, the touch method of the screen operation method in the present embodiment is not limited by the touch methods described above.

Figure 4:
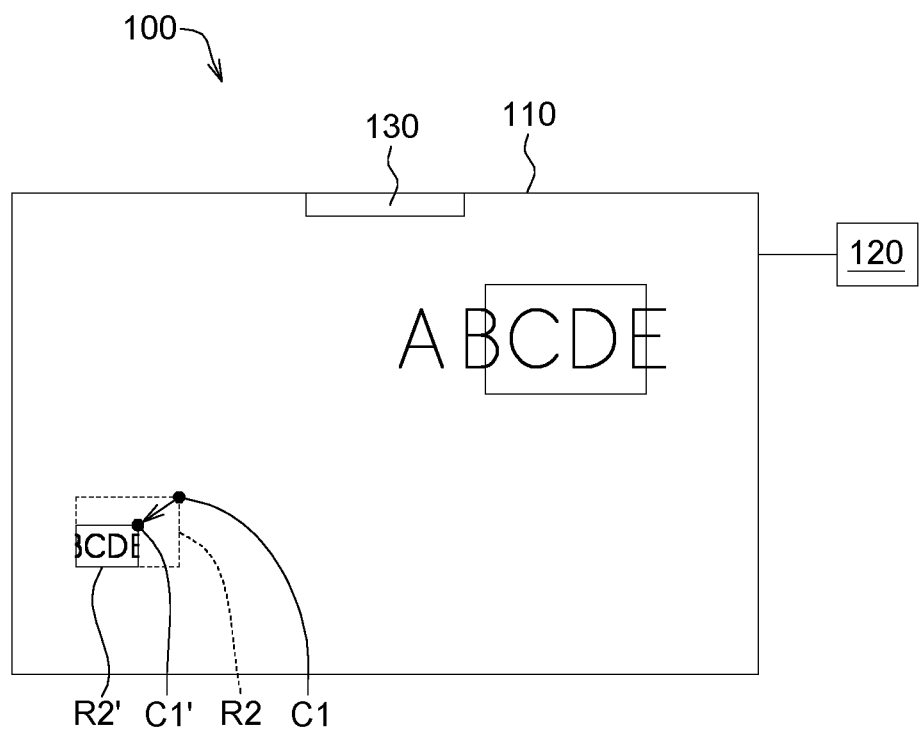
FIG. 4 shows a schematic diagram of another screen operation method of the display system of FIG. 1.

Referring to FIG. 4, FIG. 4 shows a schematic diagram of another screen operation method of the display system 100 of FIG. 1. The controller 120 responds to a scaling (or zooming) instruction to scale the size of the second region R2 without changing the range of the first region R1. The scaling instruction is generated by, for example, a user touching a corner C1 of the second region R2 with a finger, waiting for the second region R2 to float, dragging the floating second region R2 to the position C1' of FIG. 4, and then the controller 120 reducing the size of the second region R2 to the second region R2 ' as shown in FIG. 4 after releasing the floating second region R2, wherein the position C1' is a corner of the second region R2'. In addition, the touch method of the screen operation method in the present embodiment is not limited by the touch methods described above.

As shown in FIG. 4. In another embodiment, the scaling instruction is generated by, for example, a user touching a corner C1 of the second region R2 with a finger, waiting for the second region R2 to float, dragging the floating second region R2 outward, and then the controller 120 enlarging the size of the second region R2 after releasing the floating second region R2. In an embodiment, no matter whether the size of the second region R2 is reduced or enlarged, the size of the first region R1 could not be changed.

In another embodiment, the controller 120 could respond to a scaling instruction to scale the size of the first region R1 without changing the range of the second region R2. The generation method of the scaling instruction in this example is similar to the foregoing embodiment. For example, the scaling instruction is generated by, for example, a user touching a corner of the first region R1 with his finger, waiting for the first region R1 to float, dragging the floating first region R1 outward or inward, and the controller 120 enlarging or reducing the size of the first region R1 after releasing the floating first region R1. In an embodiment, no matter whether the size of the first region R1 is reduced or enlarged, the size of the second region R2 could not be changed.

Figure 5:
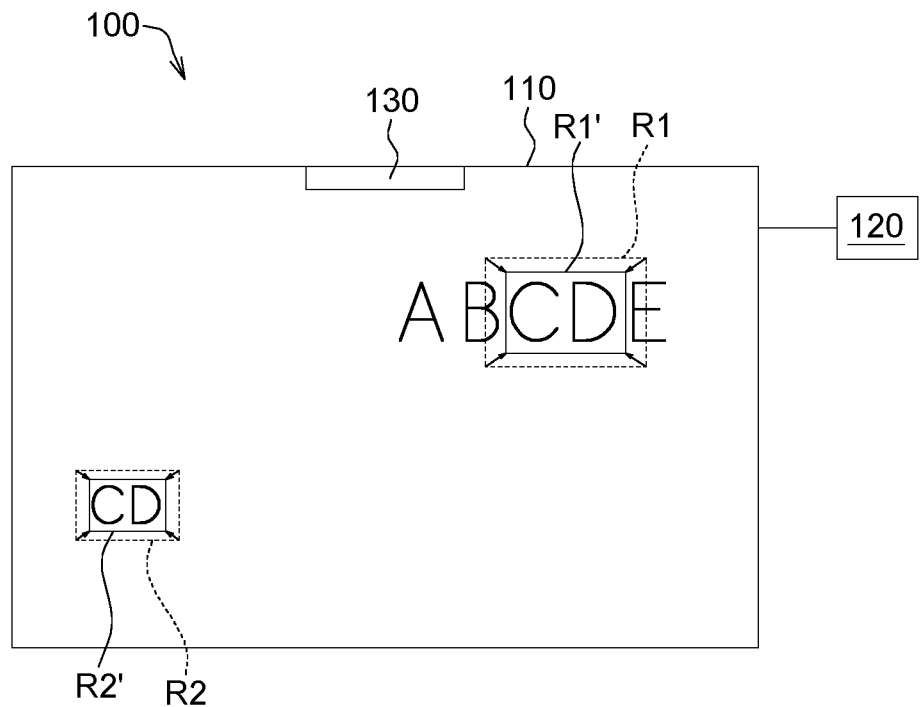
FIG. 5 shows a schematic diagram of another screen operation method of the display system of FIG. 1.

Referring to FIG. 5, FIG. 5 shows a schematic diagram of another screen operation method of the display system 100 of FIG. 1. The controller 120 responds to the scaling of one of the first region R1 and the second region R2, and scales another of the first region R1 and the second region R2.

For example, the user long presses the second region R2 with multiple fingers (for example, two fingers), waits for the second region R2 to float, and simultaneously draws the fingers closer to each other, and then the controller 120 reduces the size of the second region R2 to the second region R2' shown in FIG. 5 and correspondingly reduces the size of the first region R1 to the first region R1' shown in FIG. 5 simultaneously after releasing the floating second region R2. For another example, the user long presses the second region R2 with a multi-finger (for example, two fingers), waits for the second region R2 to float, the multi-finger simultaneously pulls away from each other, and then the controller 120 enlarges the size of the second region R2 and correspondingly enlarges the size of the first region R1 simultaneously after releasing the floating second region R2. In an embodiment, the enlargement or reduction of one of the first region R1 and the second region R2 could be reflected (or interlock) to another of the first region R1 and the second region R2, that is, another of the first region R1 and the second region R2 could enlarge or reduce according to the enlargement or reduction of one of the first region R1 and the second region R2.

Figure 6:
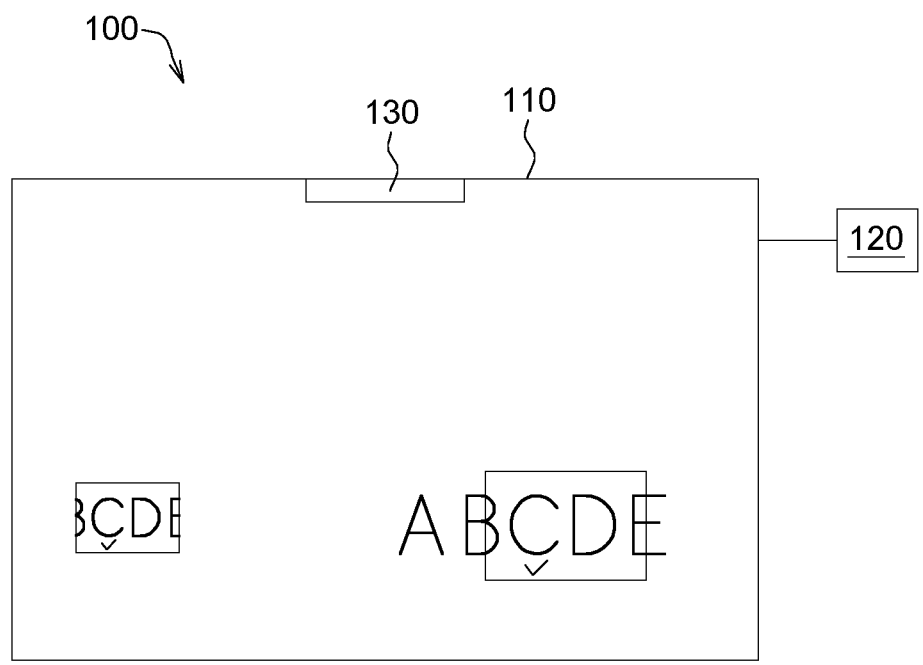
FIG. 6 shows a schematic diagram of another screen operation method of the display system of FIG. 1.

Referring to FIG. 6, FIG. 6 shows a schematic diagram of another screen operation method of the display system 100 of FIG. 1. The controller 120 could respond to the editing of the part image F11 of the first region R1 and correspondingly edit the part image F11 of the second region R2. For example, one of multiple users could edit the part image F11 of the first region R1 (as shown in FIG. 6, the user ticks the image C), and the controller 120 correspondingly edits the part image F11 of the second region R2 (as shown in FIG. 6, the controller 120 also correspondingly ticks the image C), so that another of the multiple users could nearby know editing content of the part image F11 of the first region R1 from the change of the content of the part image F11 of the second region R2.

In another embodiment, the controller 120 could respond to the editing of the part image F11 of the second region R2, and correspondingly edit the part image F11 of the first region R1. For example, one of the multiple users could edit the part image F11 of the second region R2, and the controller 120 correspondingly edits the part image F11 of the first region R1, so that another of the multiple users could nearby know the editing content of the part image F11 of the second region R2 from the change of the content of the part image F11 of the first region R1.

Figure 7:
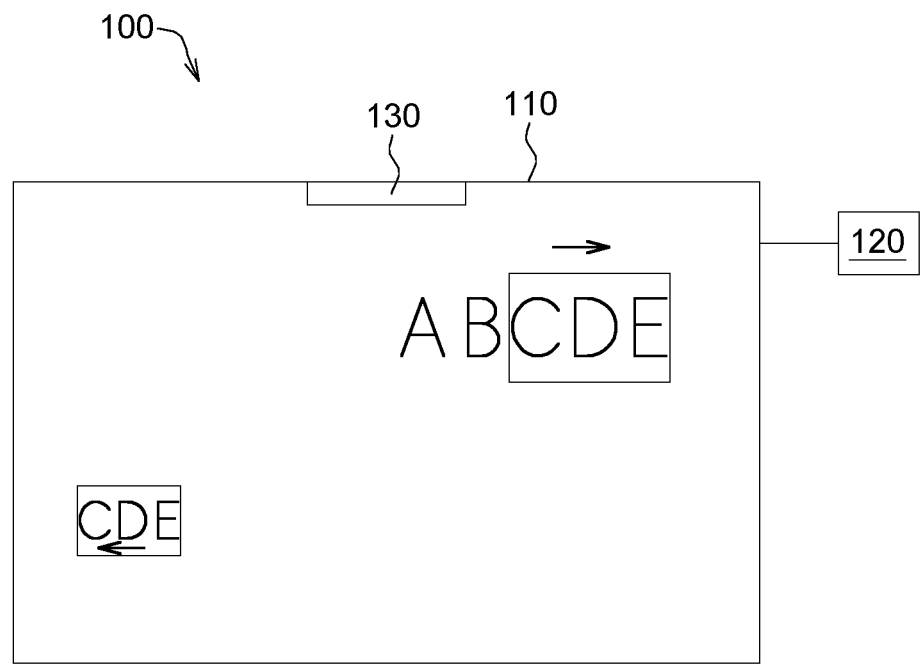
FIG. 7 shows a schematic diagram of another screen operation method of the display system of FIG. 1.

Referring to FIG. 7, FIG. 7 shows a schematic diagram of another screen operation method of the display system 100 of FIG. 1. The controller 120 could respond to the scrolling of the part image F11 of the second region R2 and continuously move the position of the first region R1 correspondingly. For example, as shown in FIG. 7, the user could leftward slide the part image F11 of the first region R1, and the controller 120 continuously rightward moves the position of the first region R1 correspondingly to allow the user to watch the part image F11 of the moved first region R1 in the second region R2. In another sliding example, the user could rightward, upward or downward slide the part image F11 of the second region R2 in the first region R1, and the controller 120 continuously leftward, downward or upward moves the position of the first region R1 correspondingly to allows the user to watch the part image F11 of the moved first region R1 in the second region R2.

Figure 8:
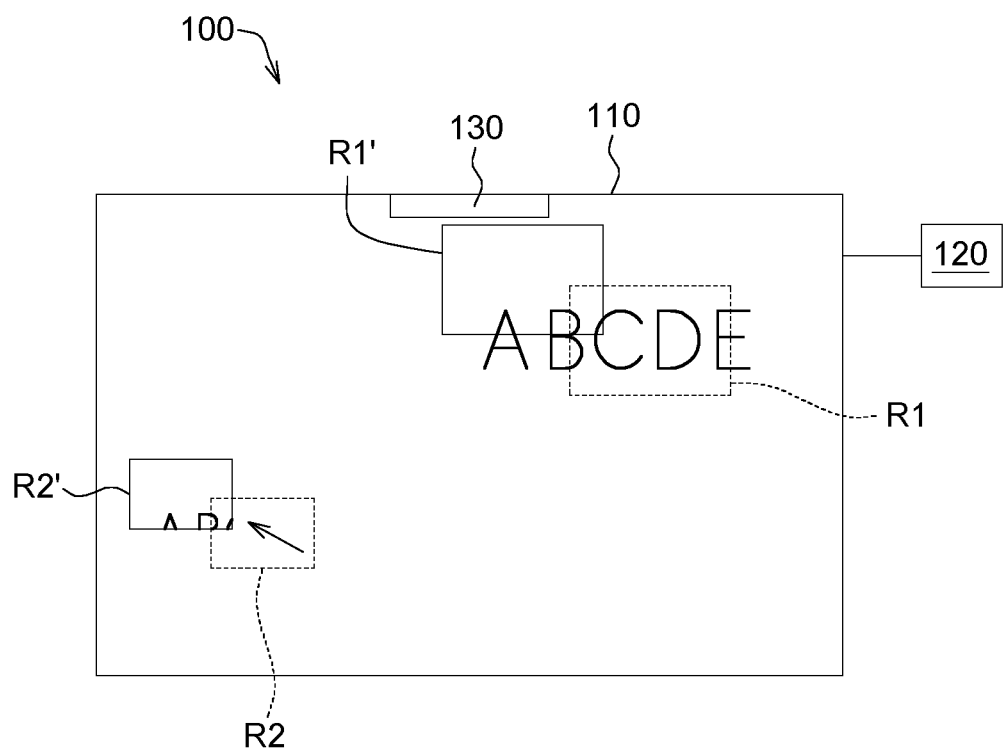
FIG. 8 shows a schematic diagram of another screen operation method of the display system of FIG. 1.

Referring to FIG. 8, FIG. 8 shows a schematic diagram of another screen operation method of the display system 100 of FIG. 1. The controller 120 could respond to the movement of the second region R2 and correspondingly move the first region R1 so that the user U1 could watch the part image F11 of the moved first region R1 in the second region R2. For example, the user could touch the part image F11 of the second region R2 with single finger, then move the single finger to the position of the second region R2' as shown in FIG. 8 at the same time, and the controller 120 moves the second region R2 to the position of the first region R1 as shown in FIG. 8 and simultaneously moves the first region R1 to the position of the first region R1' as shown in FIG. 8 correspondingly after releasing the finger. In addition, in this example, during the second region R2 dynamically moves to the second region R2', the part image F11 of the second region R2 could dynamically change according to the change of the part image F11 of the first region R1 moving to the first region R1'.

Figure 9:
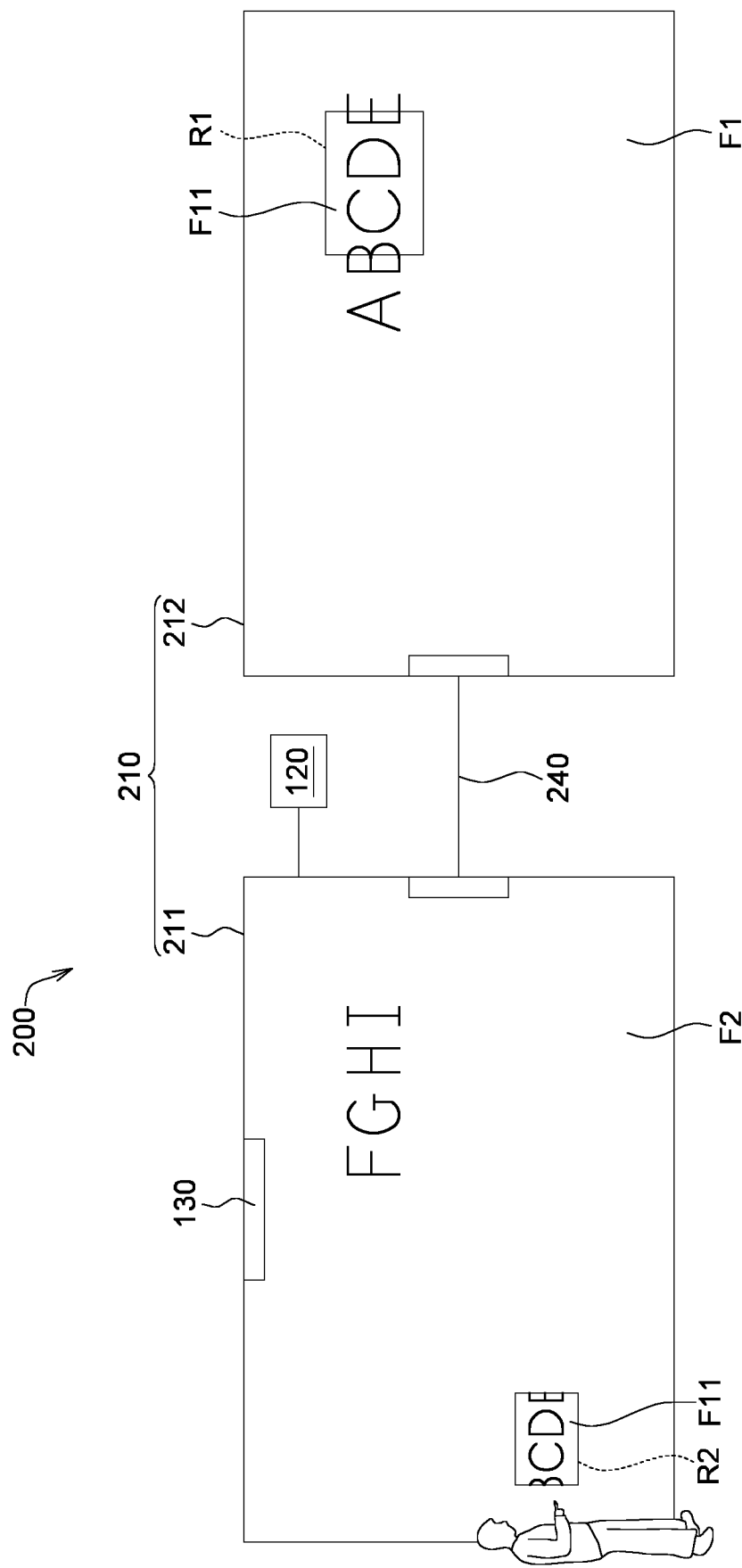
FIG. 9 shows a schematic diagram of a display system according to another embodiment of the present invention.

Referring to FIG. 9, FIG. 9 shows a schematic diagram of a display system 200 according to another embodiment of the present invention. The display system 200 includes a display module 210 and a controller 120. The display module 210 includes a first display device 211, a second display device 212, a position detector 130 and a transmission line 240. The size of one of the first display device 211 and the second display device 212 could be the same as that of the display module 110 of the display system 100, but could be larger or smaller. The position detector 130 could be disposed on the first display device 211 or the second display device 212. In another embodiment, two position detectors 130 could be respectively disposed on the first display device 211 and the second display device 212.

In the present embodiment, the first display device 211 and/or the second display device 212 is, for example, touch display device, such as electronic whiteboard. The first display device 211 and the second display device 212 are connected by a transmission line 240, so that the first display device 211 and the second display device 212 could communicate through the transmission line 240. In another embodiment, the first display device 211 and the second display device 212 further include a wireless communication module, and the first display device 211 and the second display device 212 communicate with each other through the wireless communication module. As a result, the first display device 211 and the second display device 212 could be respectively disposed in two separated spaces, but could also be located in different positions in the same space. In another embodiment, the first display device 211 and the second display device 212 could be adjacently connected in parallel. For example, the first display device 211 and the second display device 212 are directly coupled through their own connectors.

As shown in FIG. 9, the first display device 211 is configured to display the first frame F1, the second display device 212 is configured to display the second screen F2, and the part image F11 of the first region R1 is displayed on the second region R2 of the second display device 212. The second region R2 is movably covered on a part of the second frame F2. The controller 120 could be disposed on the first display device 211 or the second display device 212, and could control screen operation functions of the first display device 211 and the second display device 212 through a connection between the first display device 211 and the second display device 212.

In the screen operation method of this embodiment, the interaction method between the first region R1 and the second region R2 of the display system 200 is similar to or the same as that between the first region R1 and the second region of the display system 100 of the foregoing embodiment, and it is not repeated here. In addition, in another embodiment of the screen operation method (for the third region R3) of FIG. 3 being applied to the display system 200, the user U1 could drag edited part image F11 located in the third region R3 of the second screen F2 in the second display device 212 to the first region R1 (for example, overlay) or other area of the first frame F1 in the first display device 211.

In summary, a part image of the frame of the display module according to the embodiment of the present invention could display the first region and the second region. A user's operation on one of the first region and the second region will be reflect (or interlock) to another of the first region and the second region, so that the another of the first region and the second region also could perform the same operation. The controller could respond to an operation instruction on one of the first region and the second region, and perform the same operation on another of the first region and the second region. The operation instruction is, for example, zooming in, zooming out, moving, scrolling a part image in the region, or copying a part image in the region. In addition, the embodiment of the present invention does not limit the user's action definition of the operation instruction, which could be a finger touch action such as single-finger tapping or multi-finger tapping (such as clicking or double-clicking), long-pressing and/or dragging. The user could execute any of the foregoing operation instructions by using any finger touch operation.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A screen operation method of a display system, comprises:
   capturing a part image of a first frame displayed on the display system, wherein the part image is located in a first region of the first frame;
   displaying the part image on a second region different from the first region;
   in response to an operation of the display system on one of the first region and the second region, performing the same operation on another of the first region and the second region; and
   displaying, by a display device, the first frame;
   wherein the first region is located outside a user's arm movement scope with respect to a display surface of the display device, and the second region is located inside the user's arm movement scope with respect to the display surface of the display device.

2. The screen operation method according to claim 1, further comprises:
   displaying, by a second display device, a second frame, wherein the part image is displayed on the second region of the second display device, and the second region movably covers a portion of the second frame.

3. The screen operation method according to claim 2, wherein the first display device and the second display device are connected in parallel.

4. The screen operation method according to claim 1 wherein the part image covers the second region of the first frame.

5. The screen operation method according to claim 1, further comprises:
   tracking a first position of a user; and
   moving the second region to a second position so that the second position is adjacent to the first position.

6. The screen operation method according to claim 1, further comprises:
   in response to a copy instruction, copying the part image of the second region to a third region different from the second region, wherein the operation on the part image of the third region does not reflect to the part image of second region.

7. The screen operation method according to claim 1, further comprises:
   in response to a scaling instruction, scaling size of the second region without changing range of the second region.

8. The screen operation method according to claim 1, further comprises:
   in response to a scaling instruction, scaling size of the first region without changing range of the first region.

9. The screen operation method according to claim 1, wherein step of performing the same operation on another of the first region and the second region comprises:
   in response to scaling for one of the first region and the second region, scaling another of the first region and the second region.

10. The screen operation method according to claim 1, wherein step of performing the same operation on another of the first region and the second region comprises:
    in response to scrolling for the part image in the second region, correspondingly continuously moving position of the first region.

11. The screen operation method according to claim 1, wherein step of performing the same operation on another of the first region and the second region comprises:
    in response to movement for the second region, correspondingly moving the first region.

12. The screen operation method according to claim 1, wherein step of performing the same operation on another of the first region and the second region comprises:
    displaying boundary lines of the first region of the first frame; and
    after a predetermined time elapses, hiding the boundary lines of the first region.

13. The screen operation method according to claim 1, wherein step of performing the same operation on another of the first region and the second region comprises:
    in response to editing for the part image of the first region, correspondingly editing the part image of the second region.

14. A display system, comprises:
    a display module configured to display a first frame, wherein the first frame comprises a part image located in a first region of the first frame;
    a controller disposed on the display module and configured to capture the part image of the first frame and display the part image on a second region different from the first region;
    wherein in response to an operation for the display module on one of the first region and the second region, the controller is configured to perform the same operation on another of the first region and the second region; and
    wherein the display module comprises a display device configured to display the first frame; the first region is located outside a user's arm movement scope with respect to a display surface of the display device, and the second region is located inside the user's arm movement scope with respect to the display surface of the display device.

15. The display system according to claim 14, wherein display module further comprise a second display device, wherein the second display device is configured to display a second frame, and the second region movably covers a portion of the second frame and displays the part image.

16. The display system according to claim 15, wherein the first display device and the second display device are connected in parallel.

17. The display system according to claim 14, wherein the display module is one display device, and the first region and the second region are in the display device.

18. A display system, comprises:
    a display module configured to display a first frame, wherein the first frame comprises a part image located in a first region of the first frame;
    a controller disposed on the display module and configured to capture the part image of the first frame and display the part image on a second region different from the first region;
    wherein in response to an operation for the display module on one of the first region and the second region, the controller is configured to perform the same operation on another of the first region and the second region;

wherein the display module comprises a display device configured to display the first frame; the first region is located outside a user's arm movement scope with respect to a display surface of the display device, and the second region is located inside the user's arm movement scope with respect to the display surface of the display device; and in response to a copy instruction, copy the part image of the second region to a third region different from the second region, wherein the operation on the part image of the third region does not reflect to the part image of second region.

\* \* \* \* \*